Nov. 20, 1956     M. SIVAK     2,771,525

SIGNAL DEVICE FOR MOTOR VEHICLES

Filed Nov. 19, 1954     2 Sheets-Sheet 1

INVENTOR.
MORRIS SIVAK
BY
ATTORNEY

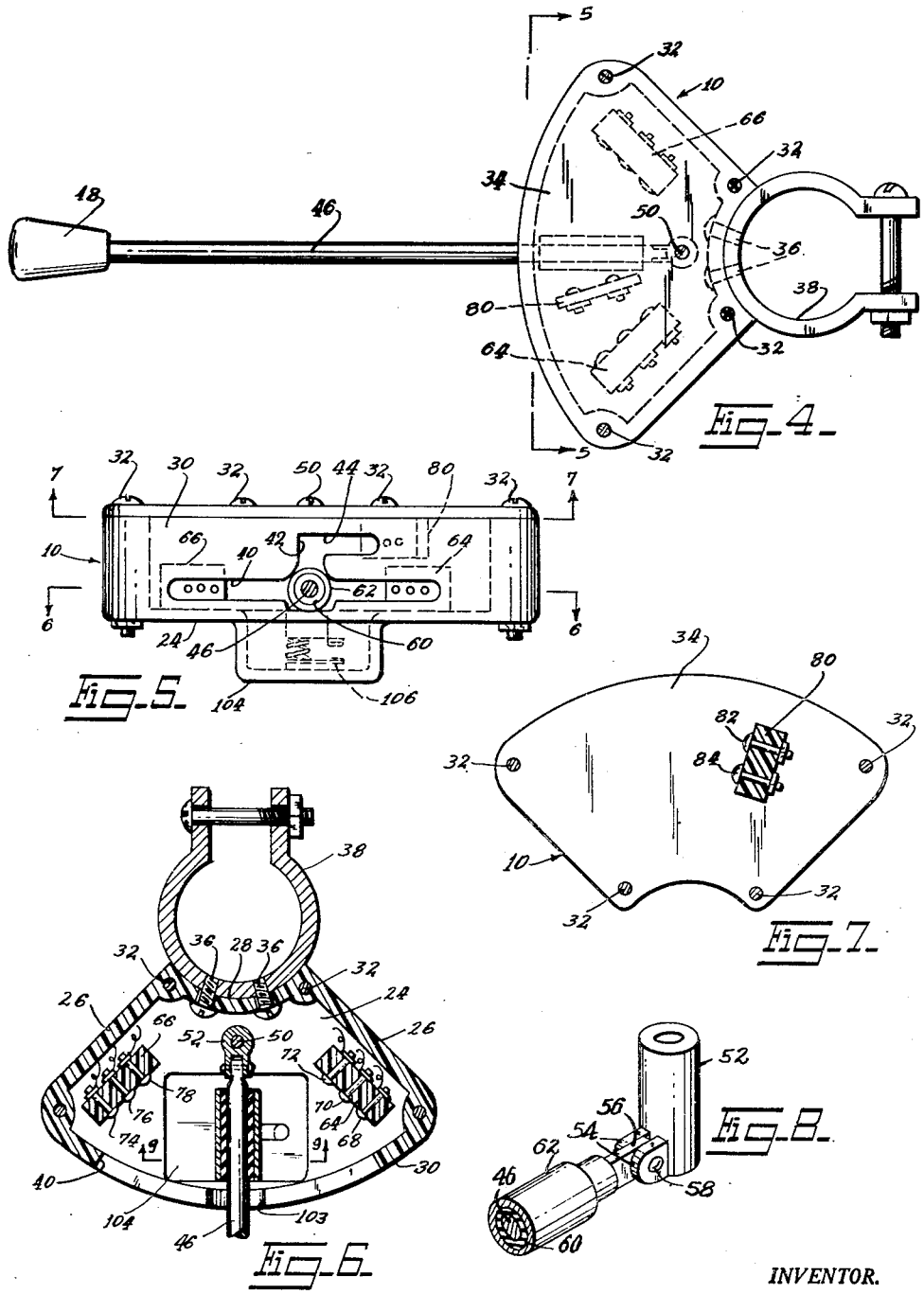

United States Patent Office 2,771,525
Patented Nov. 20, 1956

2,771,525
SIGNAL DEVICE FOR MOTOR VEHICLES
Morris Sivak, Brooklyn, N. Y.
Application November 19, 1954, Serial No. 469,886
1 Claim. (Cl. 200—61.27)

This invention relates to automobile-mounted signal devices and, more particularly, has reference to those signal devices commonly known as directional or turn signals.

Conventionally, directional signals for automobiles include a left and right blinker lamp at the front of the vehicle, and left and right blinker lamps at the rear of the vehicle. A rod mounted upon the steering column of the vehicle, when shifted to one position, sets into operation the right front and rear blinker signals, and when swung in the opposite direction, sets into operation the left front and rear blinker signals. After the vehicle steering wheel has been turned to left or right to make the turn, and is turned back to its normal position for straight ahead driving, the blinker signals are automatically stopped.

The main object of the present invention is to include a third position for the switch handle or rod, in which position both the left and right blinker signals, and in particular those at the rear of the vehicle, will simultaneously be energized to function as a means for signaling the rapid or sudden braking of the vehicle to a stop. While the ordinary brake lights of a vehicle function under these circumstances, the blinker signals are particularly adapted to focus the attention of the following vehicle operator upon the preceding vehicle.

A further object of importance is to provide a device of the type stated in which the addition of the third position of the operating handle is effected at relatively low increase in cost above that required for manufacture of a conventional directional signal.

Yet another object is to so design a device of the type stated as to permit its use not only as a warning to a following vehicle that the vehicle having the signal device is to be braked or slowed down, but also as a warning to the following vehicle that it is following too closely behind the signal-equipped vehicle.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 4 is a plan view, on an enlarged scale, of the combination directional and stop signal device, per se.

Figure 9:
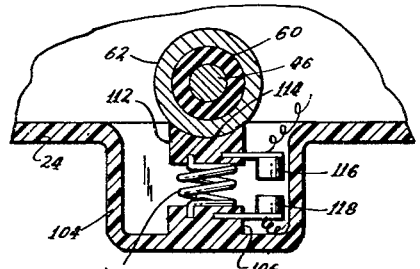

Fig. 5 is a sectional view on line 5—5 of Fig. 4.
Fig. 6 is a sectional view on line 6—6 of Fig. 5.
Fig. 7 is a sectional view on line 7—7 of Fig. 5.
Fig. 8 is a fragmentary perspective view of the handle and of a rotatable sleeve on which it is pivotally mounted.
Fig. 9 is an enlarged, detail sectional view on line 9—9 of Fig. 6.

The combination device 10 constituting the invention has been illustrated mounted adjacent a vehicle steering wheel 12 that constitutes a part of an automotive vehicle 14 having left and right front directional signal lights 16, 18, and left and right rear signal lights 20, 22.

Referring to Figs. 4–8, the combination device includes a flat, hollow casing 24 formed of plastic or other non-electrically-conductive material. The casing 24 is approximately fan-shaped in outer configuration, having a flat bottom integrally formed with a continuous peripheral flange, said flange forming (Fig. 6) outwardly divergent side walls 26 on the casing integral at their inner ends with a relatively short, arcuate inner or rear wall 28, and integral at their outer ends with an elongated, arcuate front or outer wall 30. In the several corners of the casing, the material thereof is thickened, and corner openings are formed in the thickened corner portions, receiving connecting screws 32, extending through registering openings formed in a flat cover plate 34 having an outer configuration identical to that of the casing 24.

Formed in the inner wall 28 are spaced openings, receiving screws 36 (Fig. 6), said screws being threaded into registering openings formed in the bight portion of an arcuate split spring clamp 38, having outwardly directed ears at its ends between which extends a connecting screw, whereby said clamp can be engaged tightly about the steering column, not shown, of the vehicle to mount the casing thereon.

Formed in the front wall 30 is an elongated, horizontally disposed, closed slot 40, comunicating medially between its ends with a short, upwardly extending branch slot 42, which communicates at its upper end with a lateral slot extension 44. Thus, the branch slot 42 and extension 44 cooperate to define a bayonet slot of inverted L-shape, communicating at its lower end with the mid-length part of the slot 40. An elongated operating handle 46 extends through the slot 40, and at its outer end has a knob 48. The handle 46, at its inner end, is pivotally attached to the casing, in a maner that will permit swinging of the handle in a horizontal plane between the full and the dotted line positions shown in Fig. 1.

A screw 50, extending through registering openings formed in the cover plate and in the bottom of the casing 24, is extended through the bore of an upstanding sleeve 52 (Fig. 8), the opposite ends of which abut against said cover plate and casing bottom, respectively. Sleeve 52 is rotatable upon the screw 50, and at its lower end is integrally formed with transversely spaced, outwardly extending ears 54, embracing between them a tongue 56 integrally formed upon the inner end of the rod 46. Registering openings are formed in the ears 54 and tongue 56, receiving a pivot pin 58. In this way, the rod 46 is adapted to be swung in a horizontal plane about the axis of the screw 50. However, the rod 46 is also adapted to be swung about the axis of pin 58, upwardly and downwardly in a line or plane normal to the first plane of swinging movement thereof.

That portion of the rod disposed within the hollow casing is extended through a sleeve 60 of insulating material, and circumposed about said insulating sleeve is a metallic sleeve 62 of electrically conductive material. The sleeves 60, 62 are tightly fitted in place upon the rod 46, so as not to shift longitudinally thereof.

Integrally molded with the bottom of the casing 24, and extending upwardly from said casing bottom, are blocks 64, 66, the blocks 64 having terminals or stationary contacts 68, 70, 72 mounted therein (Fig. 6). The block 66 has contacts 74, 76, 78. When the rod 46 is swung in one direction from the neutral, full line position thereof shown in Fig. 1, it engages with its sleeve 62 the several contacts 68, 70, 72. When swung in the opposite direction to its other extreme limit of its travel, it engages the contacts 74, 76, 78.

Marked upon the cover plate, above the block 66, is the indicium "R" and marked upon the cover plate above the block 64 is the indicium "L." These signify "right" and "left" turns respectively. It will be understood that when the handle 46 is shifted to the "R" position, a right turn is being signaled by the vehicle operator, and the right front and rear directional signal lights 18, 22 are illuminated. When a left turn is being signaled, the handle will be in the lower position thereof shown in Fig. 1, and the left front and rear lights 16, 20 will be energized. It will be understood that suitable flasher devices will be in circuit with the several signal lights, so as to cause them to blink or flash in the manner of conventional directional signals when turns are being signaled thereby.

Integrally formed upon the underside of cover plate 34 is the block 80, having spaced contacts 82, 84. These contacts are used when it is desired to energize both rear directional signals simultaneously, for the purpose of either signaling that the vehicle is going to be brought to a stop, or, alternatively, warning a following driver that he is too close to the signal-equipped vehicle.

Figure 3:
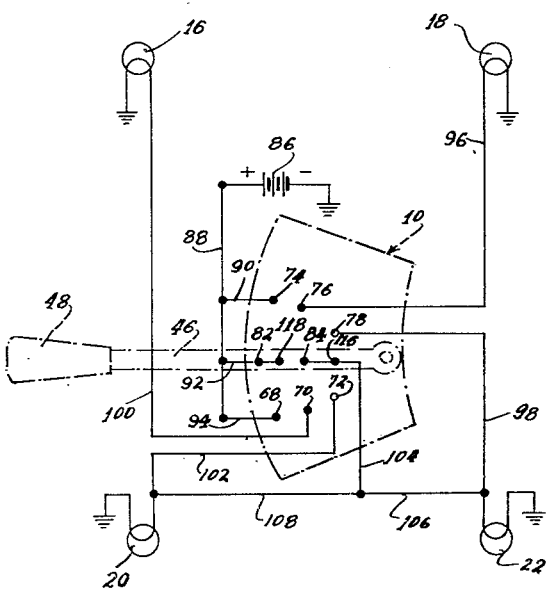
Fig. 3 is a schematic representation of the wiring employed in the device.

Referring now to the wiring diagram shown in Fig. 3, the vehicle battery has been designated at 86, and extending from the positive post thereof is a lead 88, connected by leads 90, 92 and 94 to the contacts 74, 82 and 68, respectively. A lead 96 extends from the contact or terminal 76 to the signal light 18, a lead 98 extends to the light 22 from the contact 78, a lead 100 extends from contact 70 to light 16, and a lead 102 extends from contact 72 to light 20.

Figure 1:
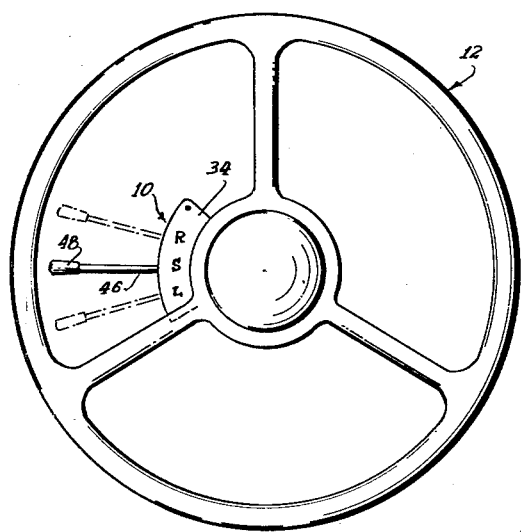
Fig. 1 is a plan view of a vehicle steering wheel equipped with a directional and stop-signaling device formed in accordance with the present invention, the dotted lines showing different positions of the operating or switch handle.

By reason of this arrangement, when the operating handle is shifted to the "R" position thereof shown in Fig. 1, the conductive sleeve 62 thereof will bridge the contacts or terminals 74, 76 and 78. As a result, current will flow from the battery 86 through the leads 96 and 98 to the right front and rear directional lights 18, 22. A right turn is thus signaled to the following driver as well as to oncoming drivers.

When the operating handle is shifted to its opposite extreme position below the indicium "L," the sleeve 62 will bridge the contacts 68, 70, 72, causing current to flow from the battery 86 through leads 100, 102 to the left front and rear directional signal lights 16, 20 respectively.

Although not illustrated, the device will have the usual means responding to the turning of the steering wheel during the making of the right or left turn, which means will automatically cause a cessation of the blinking of the directional signals and a return of the operating handle to neutral, full line position thereof shown in Fig. 1.

Figure 2:
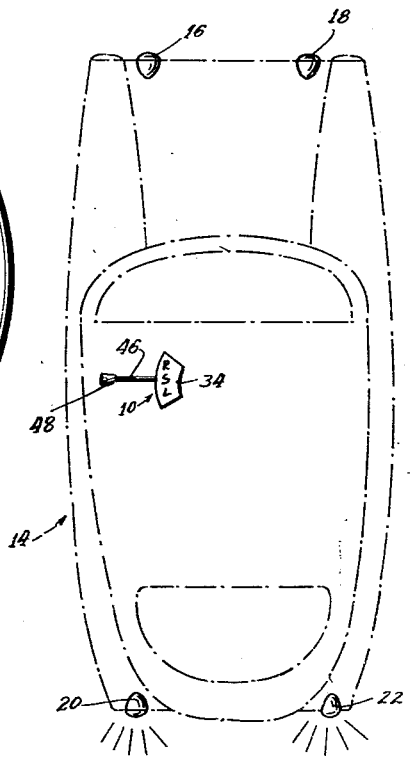
Fig. 2 is a diagrammatical illustration in which a vehicle is shown in dotted lines with both rear blinker signals in operation.

Assuming that it is desired to energize both of the rear signal lights 20, 22 simultaneously in the manner shown in Fig. 2, the user grasps the handle 46 while it is in its normal, neutral position shown in Fig. 5 and shifts the same upwardly, about the axis of pin 58 rather than in the horizontal plane in which it swings during the signaling of right or left turns. The rod 46, shifted upwardly within the branch slot 42, at the upper limit of its travel is shifted to the right in Fig. 5 within the slot extension 44, and this brings the sleeve 62 into engagement with the terminals 82, 84 of block 80 carried by the cover plate. As a result, current will flow from the battery 86 through the now bridged terminals 82, 84 and lead 104, to leads 106, 108 extending to the rear signal lights 22, 20 respectively.

When it is desired to deenergize the rear signal lights 20, 22, the operating handle is returned to the neutral position thereof shown in Fig. 5.

It will be seen that in this way, instead of energizing merely the left or right signal lights as the case may be, both left and right lights are energized simultaneously, under conditions selected by the driver of the vehicle. For example, the driver can in this way signal that he is about to slow up or stop the vehicle. Alternatively, both of the rear lights 20, 22 can be blinked at a following driver so as to cause said driver to slow up and pull back a safe distance from the signal-equipped vehicle.

The energizing of both the right and left signal lights can be accomplished not only by shifting of the handle 46 into engagement with contacts 82, 84, but also by downward swinging movement of the handle about the axis of pin 58 into a slight depression 103 formed in the bottom edge of horizontal slot 40 medially between the ends of the slot. Reference should be had, in this regard, to Figs. 5, 6 and 9. There is here shown a rectangular, depending housing 104 integrally formed upon the bottom of casing 24, and communicating at its top with the interior of the casing. Integrally formed upon the bottom of housing 104, and projecting upwardly within said housing, is a boss 106, and embedded therein is one end of an upwardly facing spring contact 118. A coil spring 110 is embedded at its lower end in boss 106, and extends upwardly therefrom. At its upper end, spring 110 is embedded in the underside of a block 112 of plastic or other insulative material, the top surface of which is formed with an arcuate depression 114 adapted to receive the sleeve 62 of handle 46 in the neutral position of the handle. Embedded in block 112 is one end of a downwardly facing spring contact 116 normally spaced to a slight extent, when the spring 110 is fully expanded, from contact 118.

The contacts 118, 116 are connected by short leads (see Fig. 3) to the contacts 82, 84 respectively.

When handle 46 is in its full neutral position, that is, the position thereof illustrated in Figs. 5 and 9, it is, as previously noted herein, so positioned that none of the contacts of the directional signal device are bridged, and accordingly, none of the lamps 16, 18, 20, 22 will be energized. However, when the vehicle operator desires to energize both the left and right directional signal lights simultaneously for the reasons previously discussed herein, he is enabled, by reason of the construction shown in Fig. 9, to momentarily, or for a longer period if desired, close a circuit to the left and right rear signal lights 20, 22. This is accomplished merely by a slight depression of the handle 46 while it is in its neutral position shown in Fig. 9. Depression of the handle in this manner is effective to compress spring 110, causing contacts 118, 116 to engage one another. These contacts are, accordingly, bridged. As a result, as will be readily apparent from Fig. 3, a circuit is closed to the rear signal lights in the same manner as said circuit is closed when the contacts 82, 84 are bridged. Said circuit will be closed as long as the operator holds the handle 46 depressed. On release of the handle, the spring 110 will expand, returning the parts to the positions thereof shown in Fig. 9, breaking the circuit to the rear signal lights.

This arrangement is desirable, since under such circumstances, the operator may not desire to shift the handle 46 upwardly and laterally into the bayonet slot 42, 44. Instead, he may desire to energize the rear signal lights only for a short period, as for example, for the purpose of imparting an immediate, short, flashing warning to a following driver. Under other circumstances, of course, a longer warning may be desired, and while said longer warning is being flashed the vehicle operator may not desire to hold the rod 46. Under said other circumstances, the rod or handle 46 would be shifted upwardly into the slot extension 44 to bridge contacts 82, 84.

The arrangement shown in Fig. 9 has the further desirable purpose of providing a seat for the operating handle in the neutral position thereof. In other words, when the operating handle shifts back to its neutral position from either of its dotted line positions shown in Fig. 1, it will drop into the recess 114 of block 112, and will accordingly be held in said neutral position.

It is to be understood that this signal device may be used to advantage while attempting to park an automobile and also while making an emergency repair on a road.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

In a directional and stop signal device for vehicles, switching mechanism including a casing having "left" and "right" sets of contacts adapted to close circuits to the left and right signal lamps respectively of a vehicle when bridged, an insulating switch handle pivoted in the casing, a conducting sleeve on said handle constituting a bridge adapted to bridge said sets in opposite extreme "left" and "right" positions to which the handle is shifted, a third set of contacts between the first and second sets bridged by the bridge in a third position of the handle and arranged to close a circuit to both the left and right signal lamps of a vehicle simultaneously, and a fourth set of contacts closed by the handle in a fourth position thereof and also arranged to close the circuit to both the left and right signal lamps simultaneously, the "left" and "right" sets of contacts being disposed in a common horizontal plane, said switch handle being pivoted about a first axis to swing in said plane, the third set of contacts being disposed above said plane, the switch handle being pivoted to swing upwardly in a plane normal to the first plane to bridge said third set of contacts, the fourth set of contacts being disposed below the horizontal plane, said switch handle when swung about the second axis thereof being shiftable downwardly to close said fourth set of contacts.

References Cited in the file of this patent

UNITED STATES PATENTS

| | | |
|---|---|---|
| 719,114 | Hiss | Jan. 27, 1903 |
| 1,549,365 | Kobzy | Aug. 11, 1925 |
| 1,612,560 | Balch | Dec. 28, 1926 |
| 1,783,718 | Kageyama | Dec. 2, 1930 |
| 2,607,840 | Hollins | Aug. 19, 1952 |
| 2,669,704 | Hollins | Feb. 16, 1954 |